G. W. WHELAN.
SHOVELS AND TONGS.
No. 189,978. Patented April 24, 1877.
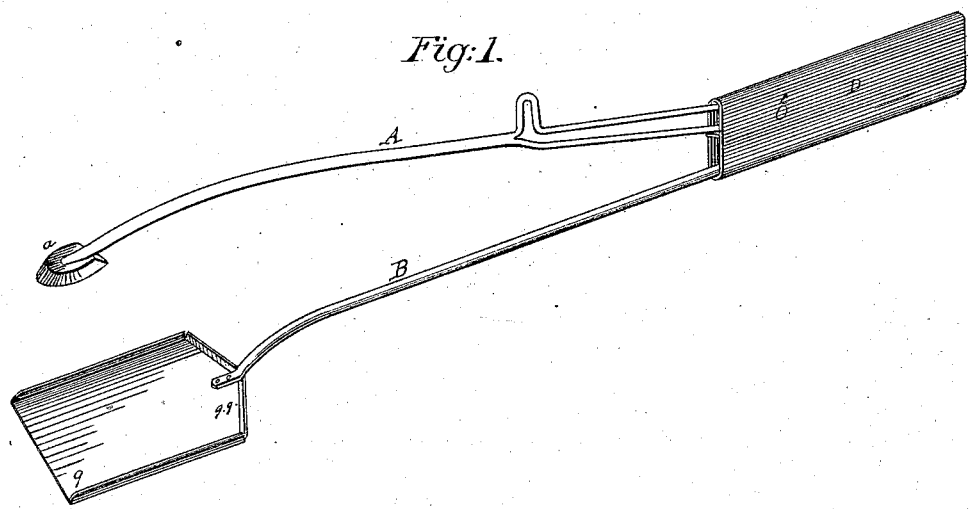
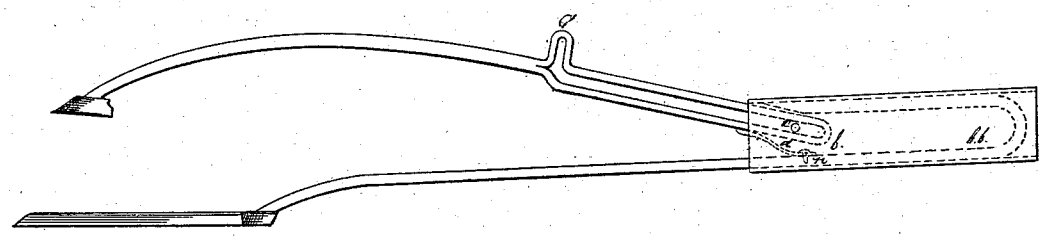

UNITED STATES PATENT OFFICE.

GEORGE W. WHELAN, OF SUN PRAIRIE, WISCONSIN.

IMPROVEMENT IN SHOVELS AND TONGS.

Specification forming part of Letters Patent No. 189,978, dated April 24, 1877; application filed October 21, 1876.

*To all whom it may concern:*

Be it known that I, GEORGE WASHINGTON WHELAN, of Sun Prairie, in the county of Dane and State of Wisconsin, have invented a new and useful Improvement in Shovel and Tongs, which improvement is fully set forth in the following specification, reference being had to the accompanying drawings.

The object of my invention is to so unite the two implements in one as to perfectly answer the uses of either in shoveling and handling fire-brands, ashes, and other like substances, by the combination, in the shovel and tongs, of one shaft, A, to a shovel, B, as shown in the perspective, Fig. 1.

I further state the object of my invention to be to unite a sugar spoon or shovel and sugar-tongs in one implement, so as to perfectly answer the uses of either in shoveling and handling sugar and other like substances by the same combination.

The shaft or arm A may be constructed of two metal wires, open to the elevated point C, and from thence to the outer end $a$ joined and soldered together, or of one piece of metal with a slot cut therein to said point. The shovel and the shaft, as well as all parts of my improved implement, may be constructed of any or all kinds of metal usually used in the manufacture of similar implements, such as iron, galvanized iron, steel, brass, copper, silver, &c.

The combination of the shaft A with the shovel B is made by means of the bolt $c$ passing through the slot in the shaft and through the handle of the shovel, permitting the shaft to slide in and out of the handle from the point $b$ to the point $b\ b$, with a spring, $d$, attached to the shovel-handle at the point $n$, and pressing upon the under side of the shaft, the whole covered and held in place and protected from the hand by the handle D, as shown in Fig. 1.

By means of the combination, as described, the shaft A can be moved outward by the hand pressing upon the elevated point G until the end $a$ is brought on a line with the end of the shovel-blade $g$, when, from the position of the slotted end of the shaft on the bolt $e$, and the upward pressure of the spring $d$ upon the under side, the shaft is thrown out, and the whole made to present the appearance of an open pair of tongs. By a like pressure of the hand in an opposite direction the shaft A is moved inward until the slotted end of the shaft reaches the point $b\ b$, and the end $a$ is brought to and close down upon the upper end of the shovel-blade.

Having described my invention, what I claim as new is—

The combination of the tong A, slotted as described, and provided with a guard or thumb-piece, G, the shovel B, having a spring, $d$, and the handle D, having a bolt or rivet, $e$, substantially as and for the purpose set forth.

GEORGE WASHINGTON WHELAN.

Witnesses:
A. M. KANOUSE,
D. P. COWL.